(12) United States Patent
Ohzu

(10) Patent No.: US 11,121,594 B2
(45) Date of Patent: Sep. 14, 2021

(54) ROTOR OF ROTATING ELECTRICAL MACHINE

(71) Applicant: HONDA MOTOR CO., LTD., Tokyo (JP)

(72) Inventor: Tatsuya Ohzu, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 88 days.

(21) Appl. No.: 16/728,829

(22) Filed: Dec. 27, 2019

(65) Prior Publication Data

US 2020/0212736 A1    Jul. 2, 2020

(30) Foreign Application Priority Data

Dec. 27, 2018 (JP) .............................. JP2018-245640

(51) Int. Cl.
*H02K 1/27* (2006.01)
*H02K 9/19* (2006.01)
*H02K 1/32* (2006.01)

(52) U.S. Cl.
CPC .............. *H02K 1/276* (2013.01); *H02K 1/32* (2013.01); *H02K 9/19* (2013.01)

(58) Field of Classification Search
CPC ............ H02K 1/276; H02K 9/19; H02K 1/32; H02K 1/2766; H02K 2213/03; H02K 1/278

USPC ............ 310/156.38, 156.53, 156.56, 156.57, 310/156.72
See application file for complete search history.

(56) References Cited

U.S. PATENT DOCUMENTS

2019/0027982 A1*    1/2019    Tsuchida ................ H02K 21/16

FOREIGN PATENT DOCUMENTS

JP            2014-100048 A    5/2014

* cited by examiner

*Primary Examiner* — Thomas Truong
(74) *Attorney, Agent, or Firm* — Paratus Law Group, PLLC

(57) ABSTRACT

A rotor of a rotating electrical machine includes a substantially annular rotor core with a plurality of magnet insertion holes formed along a circumferential direction and a plurality of magnetic pole portions including permanent magnets inserted into the plurality of magnet insertion holes. The magnet insertion hole includes a first abutment surface on which the outer diameter side first end portion of the permanent magnet slidably abuts and which extends in a substantially linear shape and a second abutment surface on which the outer diameter side second end portion of the permanent magnet slidably abuts and which extends in a substantially linear shape. The inner diameter side first end portion and the inner diameter side second end portion of the permanent magnet are located closer to a center side in the circumferential direction of the permanent magnet than the first imaginary line and the second imaginary line.

3 Claims, 3 Drawing Sheets

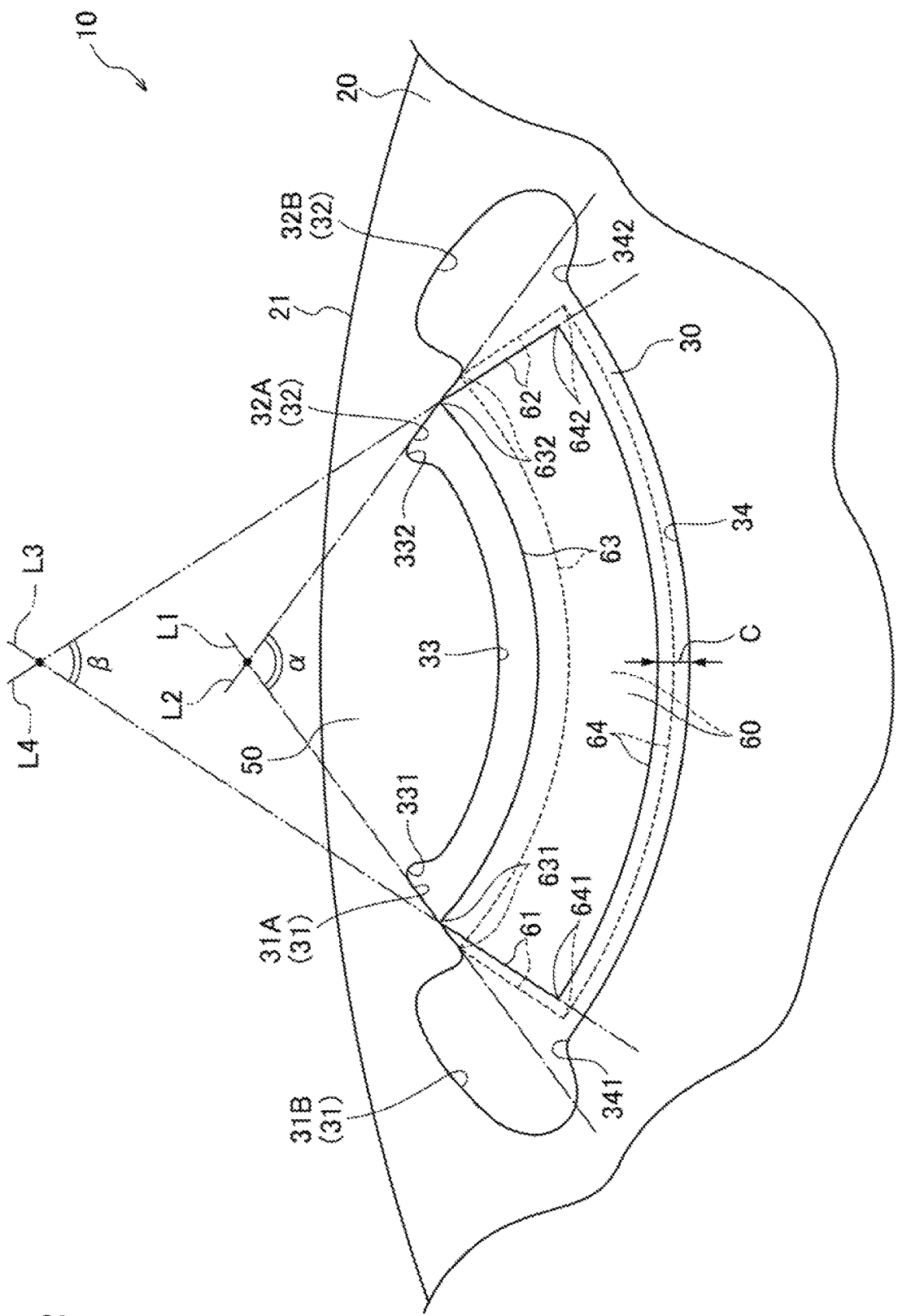

ROTOR OF ROTATING ELECTRICAL MACHINE

CROSS-REFERENCE TO RELATED APPLICATIONS

This application is based on and claims priority under 35 USC 119 from Japanese Patent Application No. 2018-245640 filed on Dec. 27, 2018.

TECHNICAL FIELD

The present invention relates to a rotor of a rotating electrical machine.

BACKGROUND ART

In recent years, as a rotor used in a rotating electrical machine, a so-called IPM motor in which a plurality of permanent magnets are arranged at predetermined intervals in a circumferential direction inside a rotor core has been known. In such an IPM motor, there is one in which an arc-shaped permanent magnet is arranged to be convex toward a rotation axis. As a means to fix the arc-shaped permanent magnet to the rotor core. For example, JP-A-2014-100048 discloses a configuration in which both end surfaces in the circumferential direction of an arc-shaped permanent magnet are brought into contact with support protrusions provided in a vicinity of both end portions in the circumferential direction of a magnet insertion hole as viewed from a rotational axis direction of the rotor core.

Generally, the material of the rotor core and the material of the permanent magnet are different, so the rotor core and the permanent magnet expand or contract at different linear expansion coefficients due to temperature changes. For example, a neodymium magnet will be described as an example. A neodymium magnet has a positive linear expansion coefficient in a magnetization direction and a negative linear expansion coefficient in a direction perpendicular to the magnetization direction. Therefore, when the temperature of the rotor rises, the rotor core expands as a whole, whereas the neodymium magnet expands in a radial direction and contracts in a circumferential direction. On the contrary, when the temperature of the rotor is lowered, the rotor core contracts as a whole, whereas the neodymium magnet contracts in the radial direction and expand in the circumferential direction.

However, in the rotor of the rotating electrical machine of JP-A-2014-100048, the permanent magnet is fixed to the rotor core by bringing both end surfaces in the circumferential direction of the permanent magnet into contact with the support protrusions provided in the vicinity of both end portions in the circumferential direction of the magnet insertion hole. Therefore, when the rotor core and the permanent magnet expand or contract with different linear expansion coefficients due to the temperature change of the rotor, a large stress is generated around the support protrusions of the magnet insertion hole and around the abutment points of the permanent magnet.

SUMMARY OF INVENTION

An aspect of the invention provides a rotor of a rotating electrical machine capable of reducing stress generated around a permanent magnet and a magnet insertion hole of a rotor core even when the rotor core and the permanent magnet expand or contract with different linear expansion coefficients.

An embodiment of the present invention relates to s rotor of a rotating electrical machine which includes:

a substantially annular rotor core with a plurality of magnet insertion holes formed along a circumferential direction; and a plurality of magnetic pole portions including permanent magnets inserted into the plurality of magnet insertion holes, in which the permanent magnet includes:

an outer diameter side first end portion and an outer diameter side second end portion forming both outer diameter side end portions;

an inner diameter side first end portion and an inner diameter side second end portion forming both inner diameter side end portions;

an outer diameter surface which extends from the outer diameter side first end portion to the outer diameter side second end portion and is curved in a convex shape radially inward;

an inner diameter surface which extends from the inner diameter side first end portion to the inner diameter side second end portion;

a first end surface which extends from the outer diameter side first end portion to the inner diameter side first end portion; and a second end surface which extends from the outer diameter side second end portion to the inner diameter side second end portion, the magnet insertion hole includes:

a first abutment surface on which the outer diameter side first end portion of the permanent magnet slidably abuts and which extends in a substantially linear shape; and a second abutment surface on which the outer diameter side second end portion of the permanent magnet slidably abuts and which extends in a substantially linear shape, the first abutment surface and the second abutment surface are arranged such that a first imaginary line which is an extension line of the first abutment surface and a second imaginary line which is an extension line of the second abutment surface intersect at the outer diameter surface side of the permanent magnet, and the inner diameter side first end portion and the inner diameter side second end portion of the permanent magnet are located closer to a center side in the circumferential direction of the permanent magnet than the first imaginary line and the second imaginary line.

According to the above embodiment of the invention, when the rotor core and the permanent magnet expand or contract with different linear expansion coefficients due to temperature changes, the outer diameter side first end portion and the outer diameter side second end portion of the permanent magnet slide and abut on the first abutment surface and the second abutment surface of the magnet insertion hole. Thereby, even when the rotor core and the permanent magnet expand or contract with different linear expansion coefficients, it is possible to reduce the stress generated around the permanent magnet and the magnet insertion hole of the rotor core.

BRIEF DESCRIPTION OF DRAWINGS

FIG. 2B is an enlarged view around the magnetic pole portion when the temperature of the rotor of the rotating electrical machine in FIG. 1 is lowered.

DESCRIPTION OF EMBODIMENT

Hereinafter, an embodiment of a rotor of a rotating electrical machine according to the invention will be described with reference to the accompanying drawings.

<Overall Configuration of Rotor>

Figure 1:
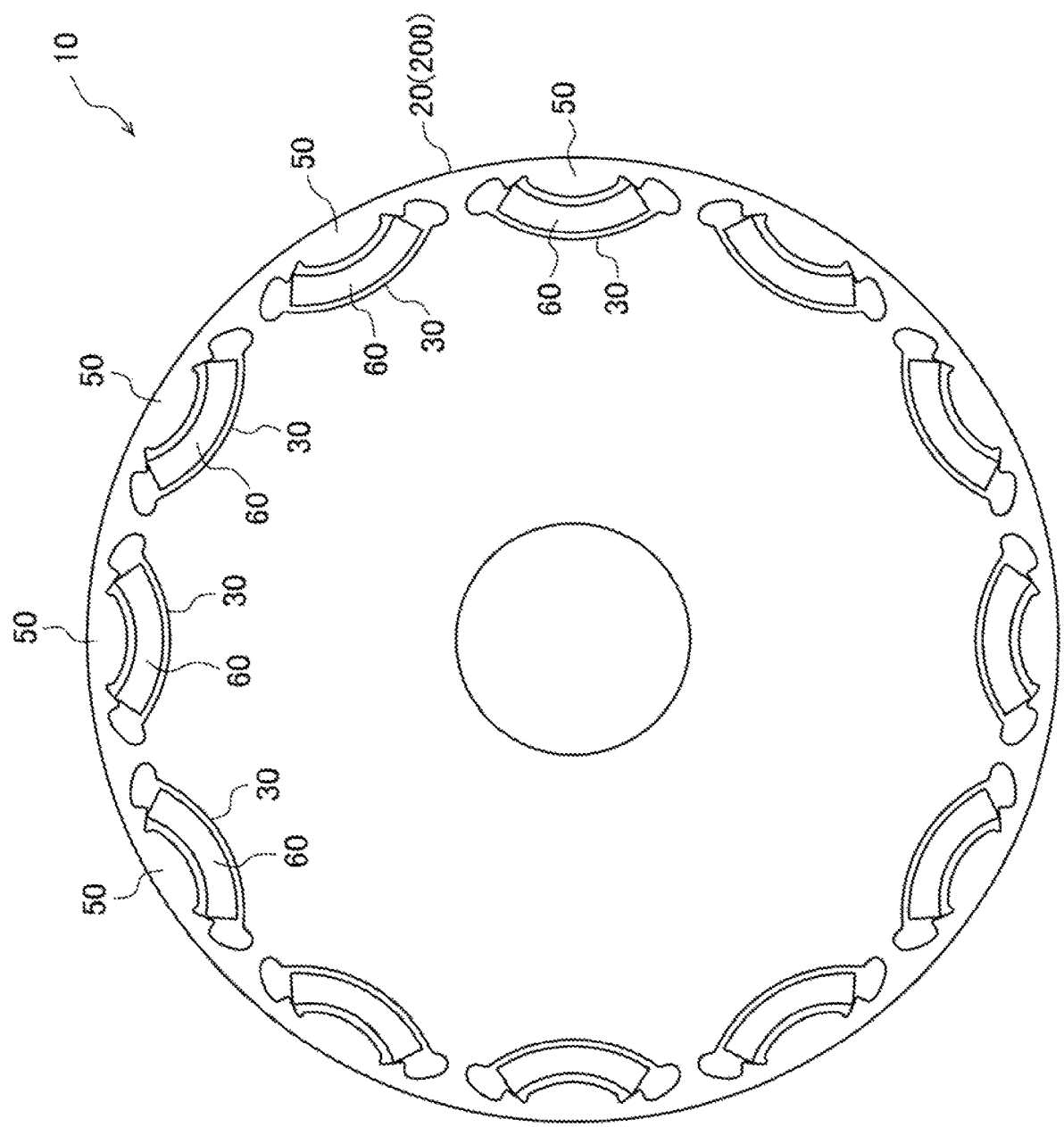
FIG. 1 is a front view of a rotor of a rotating electrical machine according to an embodiment of the invention.

As illustrated in FIG. 1, a rotor 10 of a rotating electrical machine of a first embodiment includes a rotor core 20 attached to an outer peripheral portion of a rotor shaft (not illustrated) and a plurality of magnetic pole portions 50 formed in the rotor core 20 at predetermined intervals in a circumferential direction. The rotor 10 has a substantially annular shape and is disposed on the inner peripheral side of a stator (not illustrated).

The rotor core 20 is formed by laminating a plurality of annular electromagnetic steel plates having substantially the same shape, for example, silicon steel plates 200, in the axial direction, and a plurality of magnet insertion holes 30 are formed at predetermined intervals in the circumferential direction.

The magnetic pole portion 50 is constituted by permanent magnets 60 inserted into each magnet insertion hole 30. The permanent magnets 60 are magnetized in a radial direction and are arranged so that the magnetization directions of the magnetic pole portions 50 are alternately reversed in the circumferential direction.

<Shape of Magnet Insertion Hole>

Figure 2A:
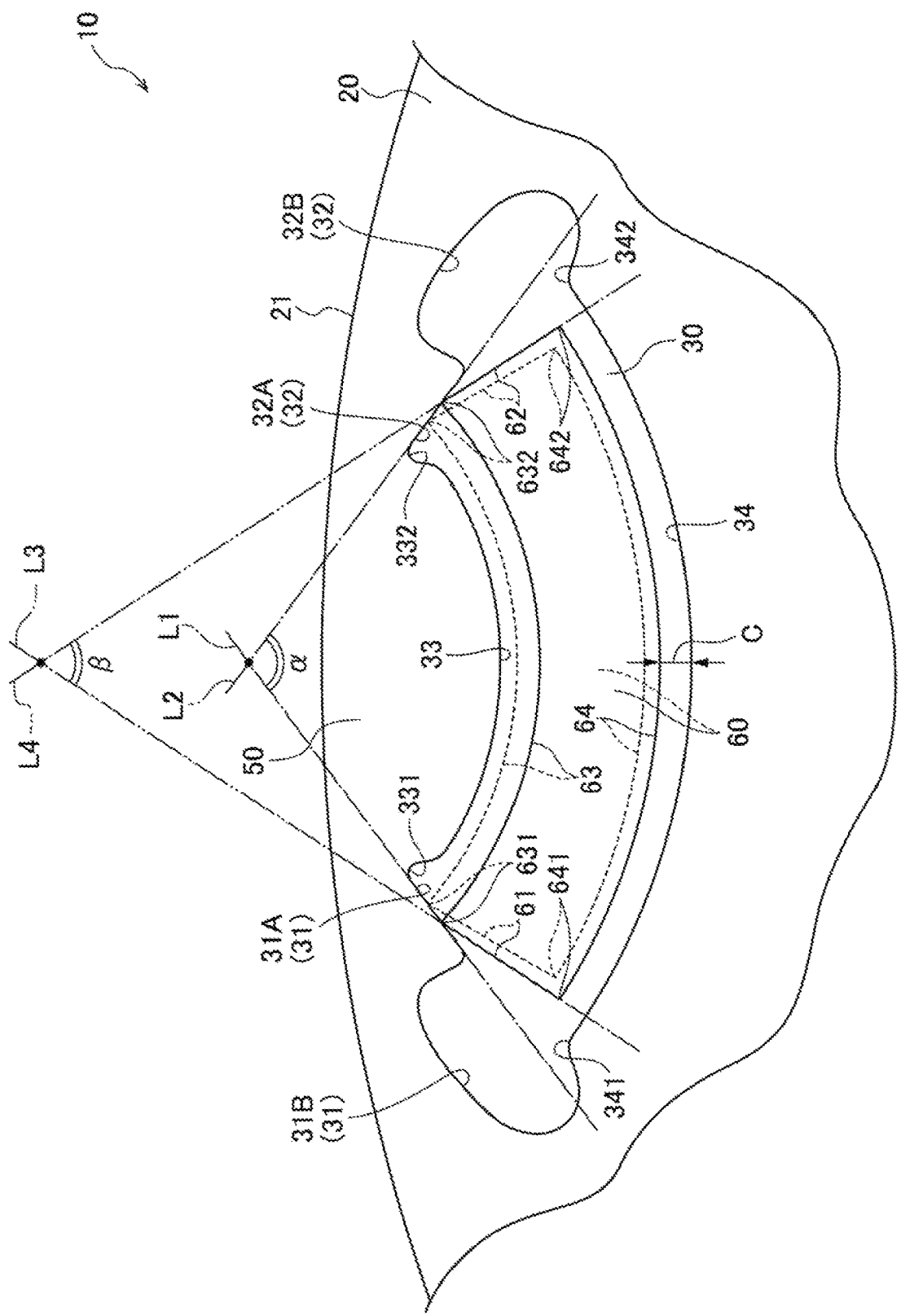
FIG. 2A is an enlarged view around a magnetic pole portion when the temperature of the rotor of the rotating electrical machine in FIG. 1 is increased.

As illustrated in FIGS. 2A and 2B, the magnet insertion hole 30 formed in the rotor core 20 includes an outer diameter side first end portion 331 and an outer diameter side second end portion 332 which form both end portions in the circumferential direction on the radially outer side and an inner diameter side first end portion 341 and an inner diameter side second end portion 342 which form both end portions in the circumferential direction on the radially inner side. The magnet insertion hole 30 includes a first end wall surface 31 extending from the outer diameter side first portion 331 to the inner diameter side first end portion 341, a second end wall surface 32 extending from the outer diameter side second end portion 332 to the inner diameter side second end portion 342, an outer diameter wall surface 33 extending from the outer diameter side first end portion 331 to the outer diameter side second end portion 332 and having an arc shape convex radially inward, and an inner diameter wall surface 34 extending from the inner diameter side first end portion 341 to the inner diameter side second end portion 342 and having a circular arc shape convex radially inward. In the embodiment, the arcs of the outer diameter wall surface 33 and the inner diameter wall surface 34 are concentric arcs.

The first end wall surface 31 of the magnet insertion hole 30 includes a first abutment surface 31A extending substantially linearly from the outer diameter side first end portion 331 and a first flux barrier forming surface 31B protruding from the inner diameter side first end portion 341 toward an outer peripheral surface 21 of the rotor core 20 and connected to a first abutment surface 31A. The second end wall surface 32 of the magnet insertion hole 30 includes a second abutment surface 32A extending substantially linearly from the outer diameter side second end portion 332 and a second flux barrier forming surface 32B protruding from the inner diameter side second end portion 342 toward the outer peripheral surface 21 of the rotor core 20 and connected to a second abutment surface 32A.

The first abutment surface 31A and the second abutment surface 32A of the magnet insertion hole 30 are disposed such that a first imaginary line L1, which is an extension line of the first contact surface 31A, and a second imaginary line L2, which is an extension line of the second abutment surface 32A, intersect on the outer diameter wall surface 33 side. Therefore, in the first abutment surface 31A and the second abutment surface 32A of the magnet insertion hole 30, the distance between the first abutment surface 31A and the second abutment surface 32A gradually increases as it extends from the outer diameter wall surface 33 toward the inner diameter wall surface 34.

<Shape of Permanent Magnet>

The permanent magnet 60 has a circular arc shape curved inward in the radial direction of the rotor core 20. The permanent magnet 60 includes an outer diameter side first end portion 631 and an outer diameter side second end portion 632 which form both circumferential end portions on the radially outer side and an inner diameter side first end portion 641 and an inner diameter side second end portion 642 which form both end portions in the circumferential direction on the radially inner side. The permanent magnet 60 includes a first end surface 61 extending from the outer diameter side first end portion 631 to the inner diameter side first end portion 641, a second end surface 62 extending from the outer diameter side second end portion 632 to the inner diameter side second end portion 642, an outer diameter surface 63 extending from the outer diameter side first end portion 631 to the outer diameter side second end portion 632 and having a circular arc shape convex radially inward, and an inner diameter surface 64 extending from the inner diameter side first end portion 641 to the inner diameter side second end portion 642 and having a circular arc shape convex radially inward. In the embodiment, the arcs of the outer diameter surface 63 and the inner diameter surface 64 are concentric arcs and the permanent magnet 60 is an arc magnet having a substantially uniform thickness in the circumferential direction.

The first end surface 61 and the second end surface 62 of the permanent magnet 60 are both substantially linear. A third imaginary line L3, which is an extension line of the first end surface 61, and a fourth imaginary line L4, which is an extension line of the second end surface 62, are arranged to intersect on the outer diameter surface 63 side of the permanent magnet 60. Accordingly, in the first end surface 61 and the second end surface 62 of the permanent magnet 60, the distance between the first end surface 61 and the second end surface 62 gradually increases as it goes from the outer diameter surface 63 toward the inner diameter surface 64.

<Arrangement of Permanent Magnet>

In the permanent magnet 60, the outer diameter side first end portion 631 slidably abuts on the first abutment surface 31A of the magnet insertion hole 30 and the outer diameter side second end portion 632 slidably abuts on the second abutment surface 32A of the magnet insertion hole 30. Here, a foam sheet or the like may be provided between the inner diameter surface 64 of the permanent magnet 60 and the inner diameter wall surface 34 of the magnet insertion hole 30. Alternatively, the magnet insertion hole 30 may be filled with a liquid medium such as a refrigerant.

The inner diameter side first end portion 641 and the inner diameter side second end portion 642 of the permanent magnet 60 are located closer to the center in the circumferential direction of the permanent magnet 60 than the first imaginary line L1 that is an extension line of the first abutment surface 31A of the magnet insertion hole 30 and the second imaginary line L2 that is an extension line of the second abutment surface 32A. Therefore, even when the permanent magnet 60 slides along the first abutment surface 31A and the second abutment surface 32A of the magnet insertion hole 30, the inner diameter side first end portion 641 and the inner diameter side second end portion 642 of the permanent magnet 60 do not abut on the first abutment surface 31A and the second abutment surface 32A of the magnet insertion hole 30. As a result, even when the permanent magnet 60 slides along the first abutment surface 31A and the second abutment surface 32A of the magnet insertion hole 30, in the permanent magnet 60, the outer diameter side first end portion 631 abuts on the first abutment surface 31A of the magnet insertion hole 30 and the outer diameter side second end portion 632 abuts on the second abutment surface 32A of the magnet insertion hole 30.

In the embodiment, the first imaginary line L1 and the second imaginary line L2 and the third imaginary line L3 and the fourth imaginary line L4 are all arranged to intersect on the outer diameter surface 63 side of the permanent magnet 60. Therefore, the space formed between the first end surface 61 and the second end surface 62 of the permanent magnet 60 and the first abutment surface 31A and the second abutment surface 32A of the magnet insertion hole 30 can be reduced, and thus the amount of magnets in the magnet insertion hole 30 can be increased. When the angle formed by the first imaginary line L1 and the second imaginary line L2 is taken as $\alpha$ and the angle formed by the third imaginary line L3 and the fourth imaginary line L4 is taken as $\beta$, $\alpha > \beta$ is satisfied. Thereby, with a simple configuration, the outer diameter side first end portion 631 of the permanent magnet 60 can abut on the first abutment surface 31A of the magnet insertion hole 30 and the outer diameter side second end portion 632 can abut on the second abutment surface 32A of the magnet insertion hole 30.

A gap C is formed between the inner diameter surface 64 of the permanent magnet 60 and the inner diameter wall surface 34 of the magnet insertion hole 30. Thereby, the permanent magnet 60 can slide radially inward. Even when the permanent magnet 60 slides radially inward, the permanent magnet 60 does not abut on the inner diameter wall surface 34 of the magnet insertion hole 30. Therefore, the stress generated in the inner diameter surface 64 of the permanent magnet 60 and the inner diameter wall surface 34 of the magnet insertion hole 30 can be reduced.

Expansion or Contraction of Rotor Core and Permanent Magnet due to Temperature Change Here, the rotor core 20 is made of a material such as silicon. On the contrary, the permanent magnet 60 is made of a magnetic material such as a neodymium magnet mainly composed of neodymium, iron, or boron. Therefore, the rotor core 20 and the permanent magnet 60 expand or contract with different linear expansion coefficients due to temperature changes. In particular, when the permanent magnet 60 is made of a neodymium magnet, the linear expansion coefficient in the magnetization direction is a positive value and the linear expansion coefficient in the direction perpendicular to the magnetization direction is a negative value. Accordingly, when the temperature of the rotor 10 rises, the rotor core 20 expands as a whole, whereas the permanent magnet 60 expands in the radial direction and contracts in the circumferential direction. On the contrary, when the temperature of the rotor 10 is lowered, the rotor core 20 contracts as a whole, whereas the permanent magnet 60 contracts in the radial direction and expands in the circumferential direction.

Hereinafter, the temperature rise and the temperature fall of the rotor 10 when the permanent magnet 60 is made of a neodymium magnet will be described with reference to FIGS. 2A and 2B.

As illustrated in FIG. 2A, when the temperature of the rotor 10 rises, the rotor core 20 expands as a whole, whereas the permanent magnet 60 expands in the radial direction and contracts in the circumferential direction. Here, as illustrated by the broken line, the outer diameter side first end portion 631 and the outer diameter side second end portion 632 of the permanent magnet 60 slid radially outward and abut along and on the first abutment surface 31A and the second abutment surface 32A of the magnet insertion hole 30. Therefore, since the abutment position between the permanent magnet 60 and the magnet insertion hole 30 are moved with the expansion and contraction of the rotor core 20 and the permanent magnet 60, even when the rotor core 20 and the permanent magnet 60 are expanded and contracted, a large stress is not generated as compared with a case where they always abut on each other at the same position. Thereby, even when the rotor core 20 and the permanent magnet 60 expand or contract with different linear expansion coefficients due to the temperature rise of the rotor 10, the stress generated around the permanent magnet 60 and the magnet insertion hole 30 of and the rotor core 20 can be reduced.

As illustrated in FIG. 2B, when the temperature of the rotor 10 decreases, the rotor core 20 contracts as a whole, whereas the permanent magnet 60 contracts in the radial direction and expands in the circumferential direction. Here, as illustrated by the broken line, the outer diameter side first end portion 631 and the outer diameter side second end portion 632 of the permanent magnet 60 slide radially inward and abut along and on the first abutment surface 31A and the second abutment surface 32A of the magnet insertion hole 30. Therefore, since the abutment position between the permanent magnet 60 and the magnet insertion hole 30 are moved with the expansion and contraction of the rotor core 20 and the permanent magnet 60, even when the rotor core 20 and the permanent magnet 60 are expanded and contracted, a large stress is not generated as compared with a case where they always abut on each other at the same position. Thereby, even when the rotor core 20 and the permanent magnet 60 expand or contract with different linear expansion coefficients due to the temperature rise of the rotor 10, the stress generated around the permanent magnet 60 and the magnet insertion hole 30 of the rotor core 20 can be reduced.

Therefore, even when the rotor core 20 and the permanent magnet 60 expand or contract with different linear expansion coefficients due to the temperature change of the rotor 10, the stress generated around the permanent magnet 60 and the magnet insertion hole 30 of and the rotor core 20 can be reduced.

The invention is not limited to embodiment described above and modifications, improvements, and the likes can be made as appropriate.

For example, in the embodiment, a case where the permanent magnet 60 is made of a neodymium magnet is described. However, the permanent magnet 60 can be made of any magnetic material such as a ferrite magnet. Even here, when the rotor core 20 and the permanent magnet 60 are expanded or contracted with different linear expansion coefficients, the stress generated around the permanent magnet 60 and the magnet insertion hole 30 of the rotor core 20 can be reduced.

The permanent magnet 60 has an arc shape curved inward in the radial direction of the rotor core 20. However, not only a permanent magnet having the arc shape but also a permanent magnet having the outer diameter surface 63 with an arbitrary shape curved in a convex shape radially inward can be used.

In the embodiment, one magnetic pole portion 50 is configured by one permanent magnet 60. However, one magnetic pole portion 50 may be configured by a plurality of permanent magnets. Here, each permanent magnet constituting the magnetic pole portion 50 and the magnet insertion hole into which the permanent magnet is inserted can have the similar shape as in the embodiment.

At least the following matters are described in this specification. Although the constituent component or the like which correspond in the embodiment described above are described in a parenthesis, it is not limited to this.

(1) A rotor (rotor 10) of a rotating electrical machine which includes:
a substantially annular rotor core (rotor core 20) with a plurality of magnet insertion holes (magnet insertion holes 30) formed along a circumferential direction; and
a plurality of magnetic pole portions (magnetic pole portions 50) constituted of permanent magnets (permanent magnets 60) inserted into the plurality of magnet insertion holes, in which
the permanent magnet includes:
an outer diameter side first end portion (outer diameter side first end portion 631) and an outer diameter side second end portion (outer diameter side second end portion 632) forming both outer diameter side end portions;
an inner diameter side first end portion (inner diameter side first end portion 641) and an inner diameter side second end portion (inner diameter side second end portion 642) forming both inner diameter side end portions;
an outer diameter surface (outer diameter surface 63) which extends from the outer diameter side first end portion to the outer diameter side second end portion and is curved in a convex shape radially inward;
an inner diameter surface (inner diameter surface 64) which extends from the inner diameter side first end portion to the inner diameter side second end portion;
a first end surface (first end surface 61) which extends from the outer diameter side first end portion to the inner diameter side first end portion; and
a second end surface (second end surface 62) which extends from the outer diameter side second end portion to the inner diameter side second end portion,
the magnet insertion hole includes:
a first abutment surface (first abutment surface 31A) on which the outer diameter side first end portion of the permanent magnet slidably abuts and which extends in a substantially linear shape; and
a second abutment surface (second abutment surface 32A) on which the outer diameter side second end portion of the permanent magnet slidably abuts and which extends in a substantially linear shape,
the first abutment surface and the second abutment surface are arranged such that a first imaginary line (first imaginary line L1) which is an extension line of the first abutment surface and a second imaginary line (second imaginary line L2) which is an extension line of the second abutment surface intersect at the outer diameter surface side of the permanent magnet, and
the inner diameter side first end portion and the inner diameter side second end portion of the permanent magnet are located closer to a center side in the circumferential direction of the permanent magnet than the first imaginary line and the second imaginary line.

According to (1), when the rotor core and the permanent magnet expand or contract with different linear expansion coefficients due to temperature changes, the outer diameter side first end portion and the outer diameter side second end portion of the permanent magnet slide and abut on the first abutment surface and the second abutment surface of the magnet insertion hole. Thereby, even when the rotor core and the permanent magnet expand or contract with different linear expansion coefficients, it is possible to reduce the stress generated around the permanent magnet and the magnet insertion hole of the rotor core.

(2) In the rotor of the rotating electrical machine according to (1),
the inner diameter surface of the permanent magnet has a gap (gap C) with respect to the magnet insertion hole.

According to (2), since the inner diameter surface of the permanent magnet has the gap with respect to the magnet insertion hole, the permanent magnet can slide radially inward. Therefore, the stress generated on the inner diameter surface of the permanent magnet and the radial inner side of the magnet insertion hole of the rotor core can be reduced.

(3) In the rotor of the rotating electrical machine according to (1) or (2),
the first end surface and the second end surface of the permanent magnet are both substantially linear and a third imaginary line (third imaginary line L3), which is an extension line of the first end surface, and a fourth imaginary line (fourth imaginary line L4), which is an extension line of the second end surface, are arranged to intersect on the outer diameter surface side of the permanent magnet, and
when an angle formed by the first imaginary line and the second imaginary line is taken as α and an angle formed by the third imaginary line and the fourth imaginary line is taken as β, α>β is satisfied.

According to (3), since the first end surface and the second end surface of the permanent magnet are both substantially linear and the third imaginary line and the fourth imaginary line are arranged to intersect on the outer diameter surface side of the permanent magnet, similarly to the first imaginary line and the second imaginary line, the amount of magnets in the magnet insertion hole can be increased. Since the angle α formed by the first imaginary line and the second imaginary line and the angle β formed by the third imaginary line and the fourth imaginary line satisfy α>β, the outer diameter side first end portion and the outer diameter side second end portion of the permanent magnet can abut on the first abutment surface and the second abutment surface of the magnet insertion hole.

The invention claimed is:

1. A rotor of a rotating electrical machine comprising:
a substantially annular rotor core with a plurality of magnet insertion holes formed along a circumferential direction; and
a plurality of magnetic pole portions including permanent magnets inserted into the plurality of magnet insertion holes, wherein
the permanent magnet includes:
an outer diameter side first end portion and an outer diameter side second end portion forming both outer diameter side end portions;

an inner diameter side first end portion and an inner diameter side second end portion forming both inner diameter side end portions;

an outer diameter surface which extends from the outer diameter side first end portion to the outer diameter side second end portion and is curved in a convex shape radially inward;

an inner diameter surface which extends from the inner diameter side first end portion to the inner diameter side second end portion;

a first end surface which extends from the outer diameter side first end portion to the inner diameter side first end portion; and a second end surface which extends from the outer diameter side second end portion to the inner diameter side second end portion, the magnet insertion hole includes:

a first abutment surface on which the outer diameter side first end portion of the permanent magnet slidably abuts and which extends in a substantially linear shape; and a second abutment surface on which the outer diameter side second end portion of the permanent magnet slidably abuts and which extends in a substantially linear shape, the first abutment surface and the second abutment surface are arranged such that a first imaginary line which is an extension line of the first abutment surface and a second imaginary line which is an extension line of the second abutment surface intersect at the outer diameter surface side of the permanent magnet, and the inner diameter side first end portion and the inner diameter side second end portion of the permanent magnet are located closer to a center side in the circumferential direction of the permanent magnet than the first imaginary line and the second imaginary line.

2. The rotor of the rotating electrical machine according to claim 1, wherein the inner diameter surface of the permanent magnet has a gap with respect to the magnet insertion hole.

3. The rotor of the rotating electrical machine according to claim 1, wherein the first end surface and the second end surface of the permanent magnet are both substantially linear and a third imaginary line, which is an extension line of the first end surface, and a fourth imaginary line, which is an extension line of the second end surface, are arranged to intersect on the outer diameter surface side of the permanent magnet, and when an angle formed by the first imaginary line and the second imaginary line is taken as $\alpha$ and an angle formed by the third imaginary line and the fourth imaginary line is taken as $\beta$, $\alpha > \beta$ is satisfied.

* * * * *